UNITED STATES PATENT OFFICE.

JESUS CASTAÑEDA, OF MEXICO, MEXICO.

PROCESS OF SEPARATING OILY INKS FROM GAUZE.

SPECIFICATION forming part of Letters Patent No. 471,323, dated March 22, 1892.

Application filed December 17, 1891. Serial No. 415,337. (No specimens.) Patented in Mexico November 18, 1891, No. 199.

*To all whom it may concern:*

Be it known that I, JESUS CASTAÑEDA, a citizen of Mexico, residing at the city of Mexico, in the Republic of Mexico, have invented certain new and useful Improvements in the Process of Separating Oily Inks from Gauzes, (for which Letters Patent have been granted in Mexico, dated November 18, 1891, No. 199;) and I do hereby declare the following to be a full, clear, and exact description of the invention, such as will enable others skilled in the art to which it appertains to make and use the same.

My invention relates to the process of separating oily inks from gauze and other similar materials that are used in cleaning engraving-plates; and it consists in cleaning and restoring both the ink and the material in the manner hereinafter described and claimed.

In the art of engraving, where oily inks are employed, the following process is now used: The ink is spread by means of a cylinder on the surface of the engraved plate until it is entirely covered. Then it is rubbed with gauze to remove all the ink except what is left in the concavities of the plate, and after polishing the plate with chalk it is put on the press, together with the paper on which the impression is to be produced. After having cleaned several plates of their ink with the same gauze the latter is entirely impregnated with ink, and therefore, being no longer of any use, it is thrown away and a new gauze used. From every plate the gauze absorbs from ninety to ninety-five per cent. of the ink employed, so that when thrown away the gauze carries with it a great deal of ink, which is wasted.

By my invention I separate the ink from the gauze, and in a manner by which the ink and gauze are both saved, thereby greatly lessening the expense of cleaning engraving-plates.

The means I employ to carry my invention into effect are as follows: As soon as the gauze has been used for the purpose mentioned and before it gets dry by exposure to the air—that is to say, before the oil is turned rancid by oxidation—it is left to macerate in a closed receptacle containing naphtha, in which are deposited the inky gauzes of the same color until a certain amount has been gathered. A separate receptacle is used for each color. After the gauze has been well washed in the liquid naphtha in which it has thus been placed all the ink and the oils will have been dissolved and separated from the gauze. The inky matter settles or is precipitated in a somewhat pasty condition at the bottom of the vessel, and the naphtha and some oils will remain at the top. The gauze is removed from the vessel, and the naphtha remaining therein is extracted by a press or other suitable means. When the gauze is dry, it is cleansed and is white and light and in a really better condition for wiping the plates than when first employed.

It now remains to save and restore the ink. The liquid naphtha and lighter oils remaining on top, as stated, and the ink having been precipitated at the bottom of the vessel, the naphtha and the accompanying oil is drawn off at the top and conveyed to any suitable distilling-vessel, where the naphtha may be distilled and cleansed of oil and inky coloring-matter in any well-known way. The precipitated inky matter is then removed or drawn off to a suitable vessel, and, as some naphtha will still remain with it, the vessel is heated, so as to drive off this naphtha by evaporation. The naphtha thus driven off is collected, distilled, and condensed by a worm or other suitable apparatus.

As during the process the ink may be deprived to some extent of its oil, it may be restored to its normal condition by the addition of a small amount of oil or oils. It may be found necessary in order to completely clear the gauze from all ink to give the same a second washing in another vessel.

I am aware that it is old to cleanse materials of oil and grease by washing them in the heavier products of petroleum, and also by the use of benzine, naphtha, and gasoline, and to employ a distilling process to subsequently purify such products; but

What I claim is—

The process of cleansing and separating for reutilization the ink and gauze used in inking and cleaning engraving-plates, consisting in first washing the gauze with the ink thereon in a vessel containing liquid naphtha, then removing the gauze and pressing the same, then drawing off the liquid naphtha from the upper portion of the vessel, then heating the remaining inky precipitate to drive off the remaining naphtha by evaporation, and finally adding to the ink thus distilled sufficient oil to restore it to its normal condition, substantially as described.

In testimony whereof I affix my signature in presence of two witnesses.

JESUS CASTAÑEDA.

Witnesses:
W. G. DOOLITTLE,
CHAS. W. BLACKWOOD.